(12) United States Patent
Craswell et al.

(10) Patent No.: US 7,877,385 B2
(45) Date of Patent: Jan. 25, 2011

(54) INFORMATION RETRIEVAL USING QUERY-DOCUMENT PAIR INFORMATION

(75) Inventors: Nicholas Craswell, Cambridge (GB); Martin Szummer, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 227 days.

(21) Appl. No.: 11/859,604

(22) Filed: Sep. 21, 2007

(65) Prior Publication Data
US 2009/0083222 A1 Mar. 26, 2009

(51) Int. Cl.
*G06F 7/00* (2006.01)
*G06F 17/30* (2006.01)

(52) U.S. Cl. ............... 707/726; 707/723; 707/724; 707/798

(58) Field of Classification Search ............ 7/1, 7/100, 723, 724, 726, 798
See application file for complete search history.

(56) References Cited

U.S. PATENT DOCUMENTS

| | | | |
|---|---|---|---|
| 5,692,107 A | | 11/1997 | Simoudis et al. |
| 6,151,595 A | * | 11/2000 | Pirolli et al. ............ 707/1 |
| 6,230,153 B1 | | 5/2001 | Howard et al. |
| 6,549,896 B1 | * | 4/2003 | Candan et al. ............ 1/1 |
| 6,792,419 B1 | | 9/2004 | Raghavan |
| 6,871,202 B2 | | 3/2005 | Broder |
| 7,117,208 B2 | | 10/2006 | Tamayo et al. |
| 7,143,091 B2 | | 11/2006 | Charnock et al. |
| 7,181,438 B1 | | 2/2007 | Szabo |
| 7,251,654 B2 | * | 7/2007 | Eiron et al. ............ 707/723 |
| 2001/0047355 A1 | | 11/2001 | Anwar |
| 2003/0220984 A1 | * | 11/2003 | Jones et al. ............ 709/219 |
| 2006/0036598 A1 | | 2/2006 | Wu |
| 2006/0064411 A1 | | 3/2006 | Gross et al. |
| 2006/0095430 A1 | * | 5/2006 | Zeng et al. ............ 707/7 |
| 2007/0143322 A1 | * | 6/2007 | Kothari et al. ............ 707/101 |

OTHER PUBLICATIONS

Awan et al. Distributed Uniform Sampling in Unstructured Peer to Peer Networks. © 2006 IEEE.*
Agichtein, et al., "Improving Web Search Ranking By Incorporating User Behaviour Information", ACM, 2006, pp. 8.
Agichtein, et al., "Learning User Interaction Models For Predicting Web Search Result Preferences", ACM, 2006, pp. 8.
Beeferman, et al., "Agglomerative clustering of a search engine query log", pp. 10.
Craswell, et al., "Random Walks on the Click Graph", ACM, 2007, pp. 8.

(Continued)

*Primary Examiner*—Charles E Lu
(74) *Attorney, Agent, or Firm*—Lee & Hayes, PLLC

(57) ABSTRACT

Information retrieval using query-document pair information is described. In an embodiment, a click record is accessed having information about queries and documents where user clicks have been observed for query-document pairs. A click graph is either formed or accessed. This has nodes connected by edges, each node representing any of a document and a query and each edge representing at least one observed click. Given at least one first node in the click graph, a similarity measure is determined between that first node and each of one or more second nodes. The second nodes are then ranked on the basis of the similarity measure results and the ranking is used to retrieve information from the click record.

19 Claims, 6 Drawing Sheets

OTHER PUBLICATIONS

Fox, et al., "Evaluating Implicit Measures To Improve Web Search", ACM, vol. 23, No. 2, 2005, pp. 147-168.

Gulli, "On Two Web IR Boosting Tools: Clustering and Ranking", at <<http://www.di.unipi.it/phd/tesi/tesi_2006/PhDthesis_Gulli.pdf>>, May 6, 2006, pp. 141.

Joachims, et al., "Accurately Interpreting Clickthrough Data As Implicit Feedback", ACM, 2005, pp. 8.

Joachims, "Optimizing Search Engines Using Clickthrough Data", ACM, 2002, pp. 10.

Kirsch, "Social Information Retrieval", at <<http://sites.inka.de/moebius/docs/socialir-thesis.pdf>>, Nov. 2nd, 2005, pp. 104.

Lafferty, et al., "Document Language Models, Query Models, And Risk Minimization For Information Retrieval", ACM, 2001, pp. 9.

Shi, et al., "Normalized Cuts And Image Segmentation", IEEE, 1997, pp. 731-737.

Szummer, et al., "Partially Labelled Classification With Markov Random Walks", pp. 8.

Thompson, et al., "Query Expansion Using Random Walk Models", ACM, 2005, pp. 8.

Tishby, et al., "Data clustering by Markovian relaxation and the information bottleneck method", pp. 7.

Toutanova, et al., "Learning Random Walk Models For Inducing Word Dependency Distributions", 2004, pp. 8.

Upstill, "Document ranking using web evidence", at <<http://www.webir.org/resources/phd/Upstill_2005.pdf>>, Trystan Garrett Upstill, Aug. 2005, pp. 244.

Wen, et al., "Clustering User Queries Of A Search Engine", ACM, 2001, pp. 162-168.

Wenyin, et al., "Semi-Automatic Image Annotation", pp. 8.

Xue, et al., "Optimizing Web Search Using Web Click-Through Data", ACM, 2004, pp. 118-126.

Yates, et al., "Modeling user search behaviour", IEEE, 2005, pp. 10.

* cited by examiner

INFORMATION RETRIEVAL USING QUERY-DOCUMENT PAIR INFORMATION

BACKGROUND

Web search systems are an example of one type of information retrieval system although the present invention is concerned with information retrieval systems of any type. Web search systems enable us to find web sites, documents, files, images and the like that best suit our requirements. Three main components are used to achieve this: web crawlers; index generators; and query servers.

Web crawlers crawl the web one link at a time and send identified web pages to be indexed. This is achieved by making use of links between web sites. This web crawling process can be thought of as a continual process of identifying new web sites and identifying updates to existing web sites.

The crawling process enables many billions of web pages to be identified and in order to make use of this information a systematic way of retrieving pages is required. An index generator provides part of this means. Similar to an index in the back of a book, the index generator identifies keywords to associate with each website's content. Then, when you search for those keywords, the search system can find the most appropriate pages out of the billions that are available.

The index generator includes such information as how often a term is used on a page, which terms are used in the page title, or in the index, for the subsequent use of the query server in ranking the documents. Other information such as the language that the web site is written in and information about how many other web sites link to the web site concerned can also be used.

A query server (also referred to as a search engine) is used to rank the index documents on the basis of how well they match user input search terms. The query server analyses the user search terms and compares them with the indexed web pages. It generates a rank or score for the indexed web pages on the basis of the user input search terms. In this way, web pages relevant to the user search terms are identified with scores or ranks to indicate the degree of likelihood of relevance.

There is an ongoing need to improve the relevance of items retrieved by information retrieval systems such as web search systems. In addition, there is a need to achieve this in a fast and computationally inexpensive manner, which reduces the need for storage resources where possible.

It is noted that the embodiments described herein are not intended to be limited to implementations which solve any or all of the above noted disadvantages.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Information retrieval using query-document pair information is described. In an embodiment, a click record is accessed having information about queries and documents where user clicks have been observed for query-document pairs. A click graph is either formed or accessed. This has nodes connected by edges, each node representing any of a document and a query and each edge representing at least one observed click. Given at least one first node in the click graph, a similarity measure is determined between that first node and each of one or more second nodes. The second nodes are then ranked on the basis of the similarity measure results and the ranking is used to retrieve information from the click record.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
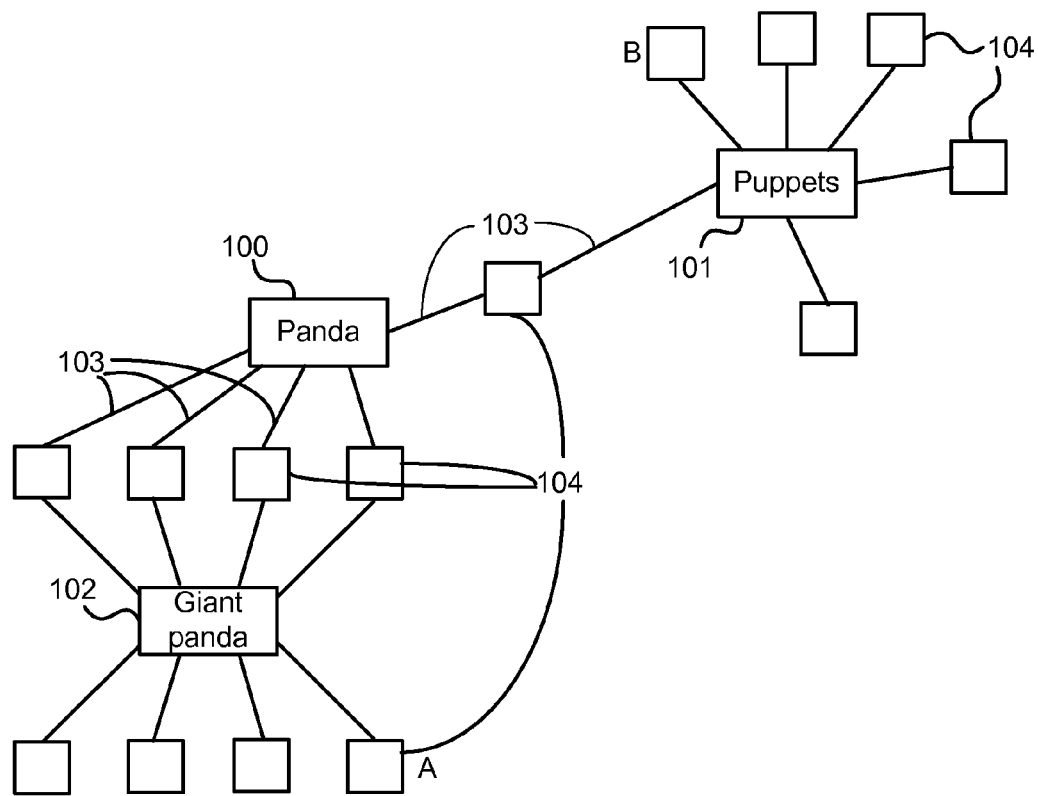
FIG. 1 is a schematic diagram of an example click graph.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a web search system, the system described is provided as an example and not a limitation. As those skilled in the art will appreciate, the present examples are suitable for application in a variety of different types of information retrieval systems.

The term "document" is used herein to refer to any item of information which may be retrieved using a query server or search engine. A non-exhaustive list of examples is: photograph, digital image, file, email message, voice mail message, short message service message, web page, part of a web page, map, electronic ink, commercial product, multimedia file, song, album, news article, database record or a summary of any one or more of these items.

The term "random walk" is used herein to refer to any type of process which comprises constructing a path from a first node in a graph to a second node in a graph where the second node may or may not be adjacent to the first node. At the current node in the path, the next node in the path is chosen at random (or on the basis of probabilities or weights associated with edges connecting the current node to the adjacent nodes) from the available adjacent nodes or, in some cases, from the current node itself as well as the available adjacent nodes. For example, this may be a Markov random walk in a forwards or backwards direction. Alternatively, properties of Markov random walks, such as first passage time, could be used.

Query servers or search engines are typically able to track which of their search results are clicked or selected by a user (human or automated agent) for which query. This information is stored to produce so called "click records" and, for a popular search engine, such records can comprise millions of query-document pairs per day. Each such query-document pair can be viewed as a weak indication of relevance because the user decided to at least view the document based on its description in the search results. The term "click record" is used to refer to a store of information about query-document pairs. It is not essential to store any information about the content of the documents; all that is required is an identifier for each document such as a URL or other address.

This query-document pair information may be used to improve information retrieval methods. However, previously this has been difficult because query-document pairs may provide inaccurate information about relevance. Also, information about clicks is typically aggregated across users, who may simply disagree about which documents are relevant. Also, information about clicks may be inaccurate or biased because of presentation issues. For example, a user typically decides whether to click based on a short summary only and is influenced by the ordering of results. In addition, for any given search, a large number of documents are never seen by the user, and are therefore not clicked.

The query-document pair information comprises noise, in that some documents are clicked and yet are not relevant. The query-document pair information is also sparse in that some relevant documents are not clicked. This noise and sparsity in the query-document pair information makes it harder to use that information to assist in information retrieval.

In order to use the large amounts of query-document pair information effectively a good representation of that information is created. The embodiments herein use a click graph for this purpose. The click graph is based on a bipartite graph comprising nodes connected by edges. It is formed from two types of nodes: nodes representing queries and nodes representing documents. An edge connects a query and a document if one or more clicks have been observed for that query-document pair by any user. The edge may be weighted according to the total number of clicks from all users although this is not essential. For example, one-step transition probabilities may be associated with each edge as described in more detail below. An example click graph is shown in FIG. 1.

Queries are represented by a first type of node and in this example, there are three query nodes, 100, 101, 102. Documents are represented by another type of node 104 and in this example, the documents are all images. The nodes are interconnected by edges 103 as mentioned above. The click graph of this example comprises a small number of nodes and edges although in practice many more nodes and edges may be present. The click graph represents clicks made by many different users rather than clicks observed during long search sessions observed for only one user.

By using the click graph it is possible to find associations between nodes that are not adjacent. For example, for a given query, documents can be found in the click graph which have not yet been clicked for that query. If such documents can be found which are relevant to the given query, then the information retrieval processes can be improved. However, it is difficult to find such relevant documents especially given the sparsity of the click graph and noise present in the click graph.

An Exemplary Method

Figure 2:
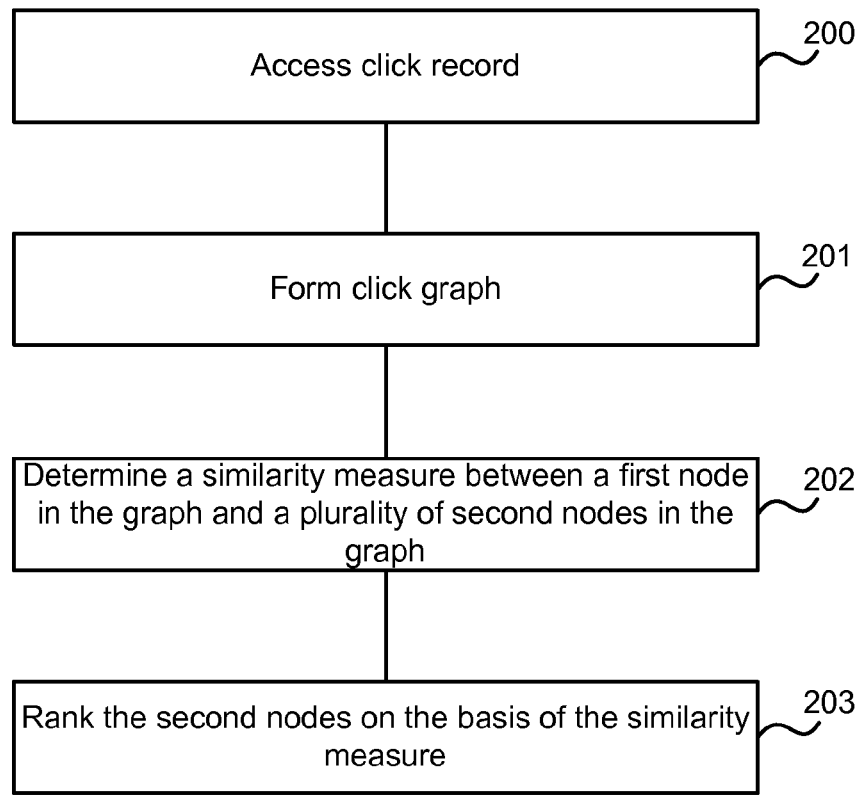
FIG. 2 is a block diagram of an example method of information retrieval using a click graph.

FIG. 2 is a block diagram of a method of using query-document pair information to improve information retrieval.

A click record is accessed (block 200) and used to form a click graph (block 201) as described in more detail below. Nodes in the graph may represent documents or queries. Given at least one first node in the graph a similarity measure between that first node and a plurality of second nodes in the graph is determined (block 202). The similarity measure is of any suitable type and a non-exhaustive list of examples is: random walk based similarity measure, distance measures, forward random walk based similarity measure, backward random walk based similarity measure, first passage time of a Random walk, or measures based on graph conductance. Other examples include average walk length and Jaccard similarity coefficient between sets of adjacent nodes.

The second nodes are then ranked on the basis of the similarity measure (block 203) and this ranking information is used in an information retrieval process of any suitable type.

As mentioned above, each node in the graph represents either a document or a query. In some embodiments the first node is a query node and the second nodes are document nodes. In this way, for a given query, a ranked list of documents is produced which may be used in an information retrieval process. For example, if a user enters the given query, a user interface may be arranged to present information retrieval results comprising or based on the ranked list of documents. This type of embodiment provides a query-to-document search application.

In other embodiments, query-to-query suggestion applications may be provided. For example, these applications take a query and find other queries that a user might like to run. In this case the first node of the method of FIG. 2 is a query node and the second nodes are query nodes. The method then produces a ranked list of queries related to the query of the first node.

In other embodiments, document-to-query annotation applications may be provided. In this case the first node is a document node and the second nodes give a ranked list of queries. An information retrieval process may then comprise annotating the document with one or more of the ranked queries to create document surrogates. These document surrogates may then assist the information retrieval process for future queries that are the same as or similar to the ranked queries.

In other embodiments, document-to-document relevance feedback applications may be provided. Here the first node of the method of FIG. 2 is a document node and the second nodes are also document nodes. In this way, given an example document that is relevant to a user, additional relevant documents may be found.

It is also possible to use more than one first node. For example, in the query-to-document case it is possible to start from multiple query nodes. In this way, a large set of "adult" queries may be taken as input (for example) and used to produce a labeling of documents, for use in adult filtering.

In the case of relevance feedback the first nodes may be mixed, including both documents and the user's original query. Also, in the case of query-to-document applications, it is possible to start from multiple query nodes as first nodes. Other combinations of types of first nodes may be used for other applications.

Example Information Retrieval System

Figure 3:
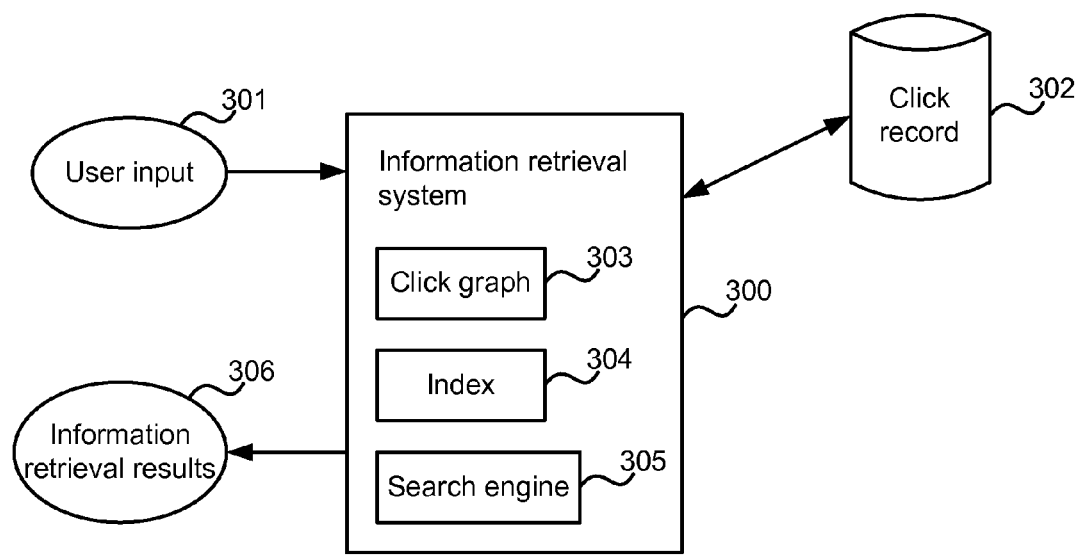
FIG. 3 is a schematic diagram of an example information retrieval system.

An example information retrieval system is shown in FIG. 3. The system 300 has an input arranged to receive user input 301 specifying a first node such as a particular query or document. The information retrieval system is able to access a click record 302 which may be a database or any other suitable storage means. The click record may be integral with the information retrieval system or independent of it as illustrated in FIG. 3. The information retrieval system 300 comprises a click graph 303 which is a representation stored using any suitable type of memory and an index 304 comprising ranked nodes obtained as a result of carrying out the method of FIG. 2 using the click graph 303. A search engine 305 is provided which retrieves appropriate results from the index depending on the user input 301. The information retrieval results 306 comprise the second nodes of the method of FIG. 2 and are output or stored by the information retrieval system 300.

More detail about the process of forming the click graph 303 is now given. As mentioned above, the click graph is based on a bipartite graph comprising nodes connected by edges. It is formed from two types of nodes: nodes representing queries and nodes representing documents. An edge connects a query and a document if one or more clicks have been observed for that query-document pair by any user. The edge may be weighted according to the total number of clicks from all users although this is not essential. For example, a one-step transition probability may be specified for each edge. These one-step transition probabilities may be related to the total number of clicks from all users for a given edge and may be normalized for click counts out of a given node. In other examples, the one-step transition probabilities may be divided equally between each edge extending from a given node so that those probabilities sum to 1. It is also possible to specify the one-step transition probabilities using a combination of these two methods.

In some embodiments it is possible to have an edge connecting a node to itself to represent a self-transition. Self-transitions allow a random walk process to stay in place. For example, this corresponds to a user preferring a current query or document and not changing it for a step.

In an example, D is the set of documents and Q is the set of queries. a graph is constructed whose nodes V are the union of these, V=D∪Q. The edges ε correspond to user clicks, optionally with weights given by click counts $C_{jk}$, associating node j to k.

The probability of making a transition from node j to node k is specified as $P_{t+1|t}(k|j)$ and is determined by normalizing the click counts out of node j, so $$P_{t+1|t}(k|j) = C_{jk} \bigg/ \sum_i C_{ji},$$

where i ranges over all nodes. The notation $P_{t_2|t_1}(k|j)$ will denote the transition probability from node j at step $t_1$ to node k at time step $t_2$. While the counts $C_{jk}$ are symmetric, the transition probabilities $P_{t+1|t}(k|j)$ generally are not, because the normalisation varies across nodes. However, it is not essential to use click counts to determine the transition probabilities. Instead the transition probabilities may be divided equally between each edge extending from a given node so that those probabilities sum to 1.

The original click edges form a bipartite graph, and in some embodiments this is extended by adding self-transitions to the nodes. Let the self-transition probability be s. Then the transition probabilities become $$P_{t+1|t}(k|j) = \begin{cases} (1-s)C_{jk} \bigg/ \sum_i C_{ji} & \forall k \neq j \\ s & \text{when } k = j. \end{cases} \quad (1)$$

Self-transitions allow the random walk to stay in place, and reinforce the importance of the starting point by slowing diffusion to other nodes. In query formulation terms, this corresponds to the user favouring the current query or document, and not changing it for a step.

The one-step transition probabilities may be arranged as a matrix A whose j, k-th entry is $P_{t+1|t}(k|j)$. The matrix A is row stochastic so that rows sum to 1.

In some embodiments the similarity measure of FIG. 2 is based on a random walk process. In an example the random walk comprises calculating the probability of transitioning from node j to node k in t steps, denoted $P_{t|0}(k|j)$, and equal to $P_{t|0}(k|j)=[A^t]_{jk}$.

This random walk sums the probabilities of all paths of length t between the two nodes. It gives a measure of the volume of paths between these two nodes; if there are many paths the transition probability is higher.

In the example described above the random walk process is a forward random walk and it comprises summing the probabilities of all paths of length t between two nodes. It is also possible to use variants on this random walk process. For example, the probabilities may be combined in other ways besides summation, one could use only the probability of the most likely path; or the first passage time of the random walk; graph conductance, or any other property of the random walk.

In another example, a backward random walk process is used. For example, given that a t-step walk ended at node j, the probability of starting at node k, denoted $P_{0|t}(k|j)$ is found. This is calculated by Bayes rule $P_{0|t}(k|j) \propto P_{t|0}(j|k)P_0(k)$, assuming that the starting points are chosen uniformly at random, $P_0(k)=1/N$, where N is the number of nodes. The normalisation required by Bayes rule can be written as a matrix multiplication, so that $P_{0|t}(k|j)=[A^t Z^{-1}]_{kj}$, where Z is diagonal and $$Z_{jj} = \sum_i [A^t]_{ij}.$$

The nodes are ranked according to $P_{0|t}(k|j)$.

The random walks may be computed in any suitable manner. In some embodiments these are computed in an efficient manner as follows (although this is not essential). Using this type of efficient computation makes it more practical to deal with large click records having terabytes of information.

The one-step transition probabilities are represented as a sparse matrix A. For a backward walk, the distribution of transition probabilities at step t is represented as a vector $q_j$ with a single unit entry corresponding to the query node j.

$$P_{0|t}(k|j) = \left[ \frac{1}{Z_j} A( \ldots (A(Aq_j))) \right]_k,$$

is calculated in order of the parentheses, and where $Z_j$ normalises the result to sum to one over k. This is efficient because these matrix operations are sparse. Similarly, to calculate a forward random walk the start distribution is encoded as a row vector $v_j$ with a unit entry at query node j, to obtain $P_{t|0}(k|j)=[(((v_jA)A)\ldots)A]_k$.

Figure 4:
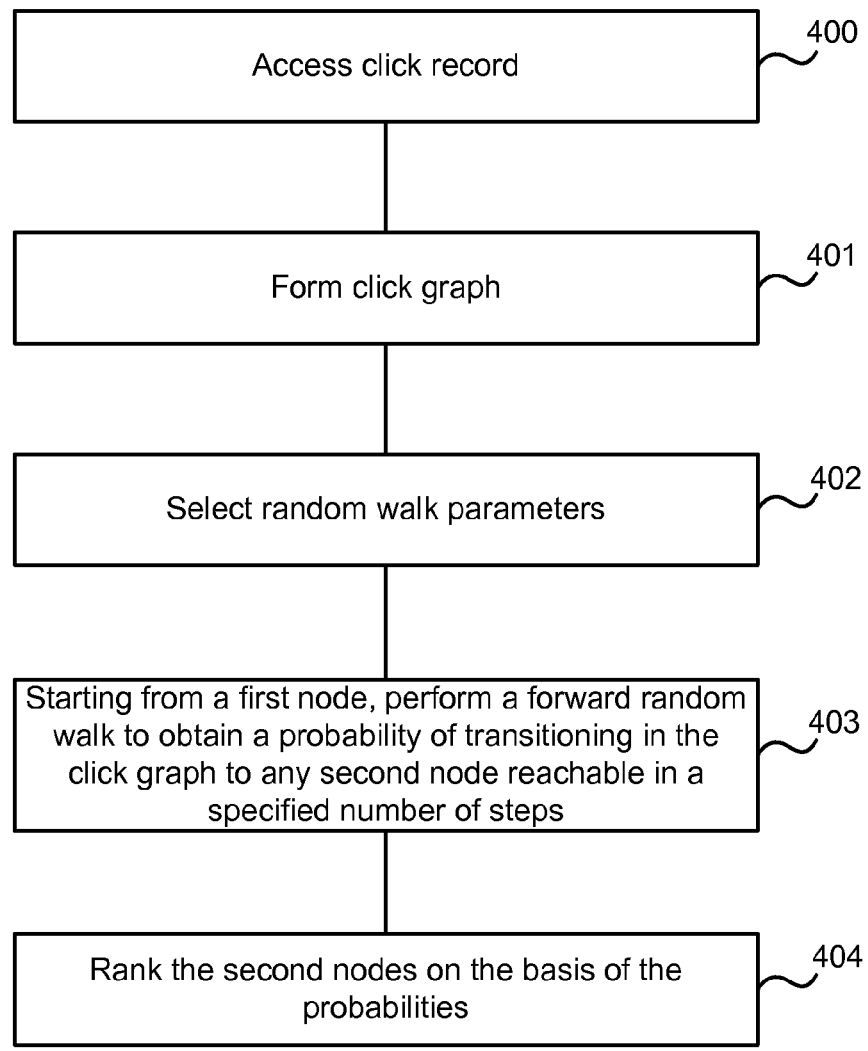
FIG. 4 is a block diagram of another example method of information retrieval using a forward random walk.
Figure 5:
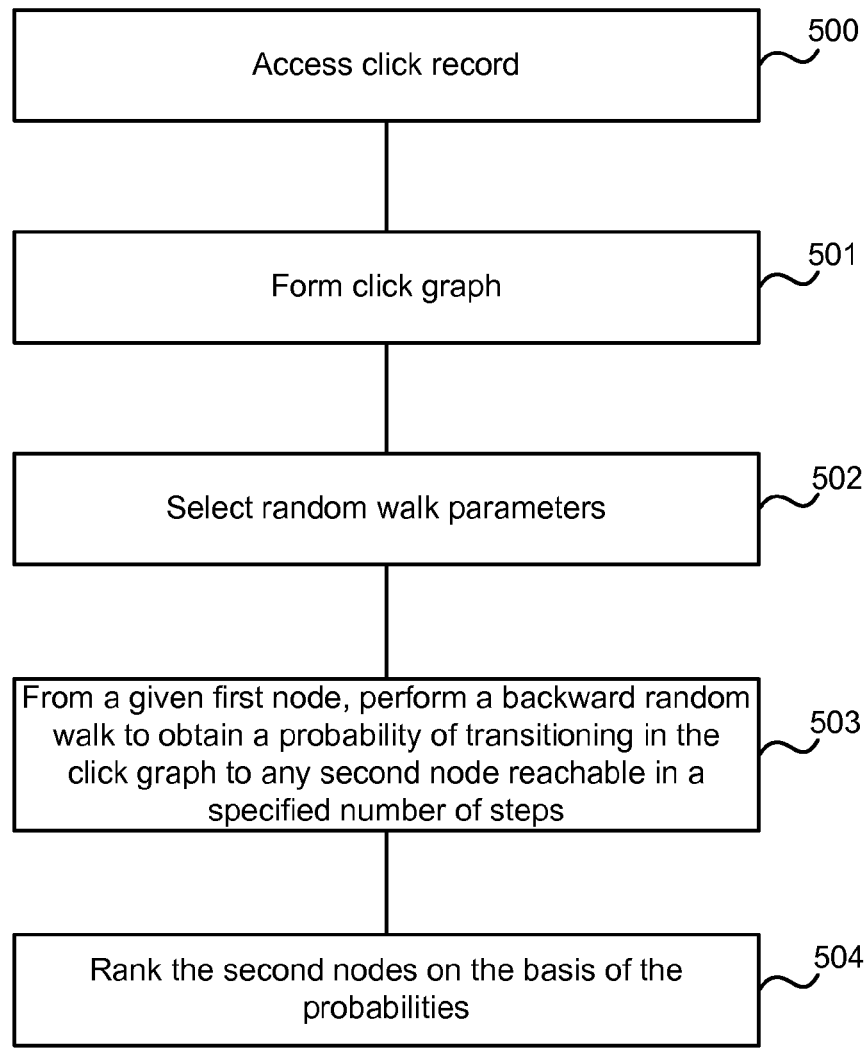
FIG. 5 is a block diagram of another example method of information retrieval using a backward random walk.

As mentioned above it is possible to carry out either a forward random walk process or a backward random walk process and this is now described in higher level terms with reference to FIGS. 4 and 5.

A click record is accessed (block 400) and a click graph is formed (block 401) as described above. Random walk parameters are then selected (block 402) as described below and a forward random walk is carried out. For example, these random walk parameters include a path length t and one-step transition probabilities stored in a transition probability matrix A. A self-transition parameter may also be specified in the case that self-transitions are included in the click graph. Starting from a first node, a forward random walk is performed to obtain a probability of transitioning in the click graph to any reachable second nodes in the specified number of steps t, being the path length (block 403). Documents (or queries) corresponding to the second nodes may then be ranked on the basis of the transition probabilities determined in the forward random walk process (block 404). This rank information may then be used by an index generator or other component of an information retrieval system. The rank information is thus obtained without the need to consider content of the documents or to consider content of the queries. Also, the rank information includes information about relevant documents (or queries) which have not yet been clicked for the particular query (or document).

In the case that the random walk process combines the probabilities of paths, this process can be thought of as giving a measure of a volume of paths between two nodes. If there are many paths between two nodes the resulting transition probability is high. For example, consider nodes A and B of FIG. 1. Here document nodes A and B are equidistant from query node "panda" 100 that distance being 3 edges. The random walk process described herein may sum over paths so that document node A benefits from having 4 distinct paths of length 3. In contrast, document node B has one distinct path of length 3. Thus document node A achieves a higher transition probability than document node B and is considered more relevant to the query "panda".

The random walk process is also beneficial as it implicitly finds clusters of nodes since multiple weighted paths in the click graph are considered and, as the walk gets longer, is more likely to find second nodes which are in the same cluster as the first node rather than in different clusters from the first node. This improves the ability of the process to find relevant nodes in the click graph even though many irrelevant nodes may be present in the click graph relatively nearby the start node. For example, the random walk process implicitly performs a soft clustering of nodes. As the walk gets longer, the identity of nodes in clusters blurs together. Given an end node that is part of a cluster, there are similar probabilities of having started the walk from any node in the cluster, but lower probability for nodes outside the cluster. The clusters do not have hard boundaries, and a ranking of nodes is still retained for finite walks, as the start point probabilities do not become exactly equal. Clustering may also suppress the effect of spurious edges that may be due to noise.

FIG. 5 is a block diagram for information retrieval using a backward random walk process. Here, a click record is accessed (block 500) and a click graph is formed (block 501). Random walk parameter values are set (block 502) as mentioned below. Starting from a given first node a backward random walk is performed to obtain a probability of transitioning in the click graph to any second nodes reachable in the specified number of steps (block 503). The second nodes are then ranked on the basis of the probabilities (block 504).

For example, the backward random walk takes as the first node, a given node j at which a t step walk ended. It calculates the probability of starting at a node k (referred to as a second node in FIG. 5) by using Bayes rule (or a similar update process) assuming that the starting points (second nodes) are chosen uniformly at random.

The backward random walk embodiments may be thought of as diagnostic. For example, to find the cause of a query j, an inference is made as to what document k the walk may have arisen from. The forward random walk model may be thought of as predictive. For example, starting from a query j, probabilities of ending at particular documents are calculated. As the path length tends towards infinity, the forward random walk embodiments are observed to approach a stationary distribution which gives high probability to nodes with large numbers of clicks. For example, if nodes relating to documents associated with a popular entertainment artist are extremely frequently clicked, then long forward random walks will tend to reach those nodes. As the path length tends towards infinity, the backward random walk embodiments are observed to approach a uniform prior starting distribution. For example, to find the cause of a query, if the path length is very long, any random document may have been the starting point. It has been found experimentally (as described below) that the backward random walk embodiments give improved information retrieval results as compared with forward random walk embodiments.

Random Walk Parameters

As mentioned above random walk parameter values are set in advance of carrying out the random walk process. For example, these parameters may comprise a transition probability matrix and a path length or number of steps in the walk.

The transition probability matrix for one-step transitions may be specified as mentioned above and by normalizing the click counts out of each node. Alternatively, the one-step transition probabilities may be divided equally between each edge extending from a given node so that those probabilities sum to 1. For example, using the following equation:

$$P_{t+1|t}(k|j) = \begin{cases} C_{jk} / \sum_i C_{ji} & \forall j \in Q \\ P_{t+1|t}(j|k) / \sum_k P_{t+1|t}(j|k) & \forall j \in D \end{cases} \quad (2)$$

In this case some transitions are normalized by probability rather than by click count. Here, transitions from documents to queries (for example) are invariant to the popularity (absolute click counts) of queries. In other embodiments both absolute and relative click-counts may be used to specify the one-step transition probabilities.

The number of steps in the walk can be thought of as determining a resolution of the walk. For example, a short walk preserves information about a starting node at a fine scale. For example, start nodes close to the end node have much higher probability than other nodes, and nodes further away cannot even be reached and have zero probability. A long walk may be though of as preserving only coarse information about any cluster of nodes the walk began from. Using this information the number of steps in the walk may be configured by an operator or may be set to a default value.

In other embodiments the number of steps in the walk (also the path length t) is selected heuristically based on the diameter of connected components in the graph. For example, the walk length may be set to be t for nodes that are part of a connected component of diameter t.

In other embodiments the number of steps in the walk is selected on the basis of a mixing time of the click graph. The mixing time of a click graph measures the time it takes to approach the stationary distribution and the stationary distribution represents the situation when all information about the starting node (document or query) is lost. The number of steps in the walk is then selected so that the stationary distribution is not reached.

In other embodiments the number of steps in the walk is selected on the basis of a combination of information about the diameter of a singly connected graph and information about mixing time of the graph.

A self-transition parameter value (which is a probability value) may also be set. This influences how quickly the random walk diffuses. For example, a self-transition probability close to 1 corresponds to a slow walk, which mostly stays at the same node. Such a walk requires a large number of steps before other nodes accumulate any significant probability. For example, a self-transition probability close to 0 corresponds to a fast walk which forces a change of node at each step.

It is also possible to use a decaying exponential distribution over walk lengths when setting the self-transition parameter. This puts more emphasis on shorter walks but still includes arbitrarily long walks.

The information retrieval methods described herein may be extended by allowing any clicks made on the information retrieval results to be used to update the click graph. In this way new edges in the click graph may result and over time, sparsity in the click graph may reduce. The updates may be made dynamically during use of the information retrieval system and/or may be made offline on a periodic basis.

In a particular example, a click record comprising information from a plurality of image search engines was obtained. The application being considered was query to document adhoc search. The main variables of study were walk length (1, 11 or 101 steps), self-transition probability (0 or 0.9) and random walk direction (forward or backward). It was found that a backward walk was more effective than a forward walk in each of these study cases. Having said that, forward random walk was effective and workable as well although not as effective as backward random walk for this query to document search application. As for the length of the walk, the best results for these study cases were obtained using a walk length of 11 steps with either value of the self-transition probability, or using a walk length of 101 steps with a self-transition probability of 0.9. However, the variable values selected for this study are limited and the methods described herein are in no way intended to be limited to use only with those variable values or random walk directions. Other variable values may also be used and indeed may be more appropriate for other applications and click records.

Exemplary Computing-Based Device

Figure 6:
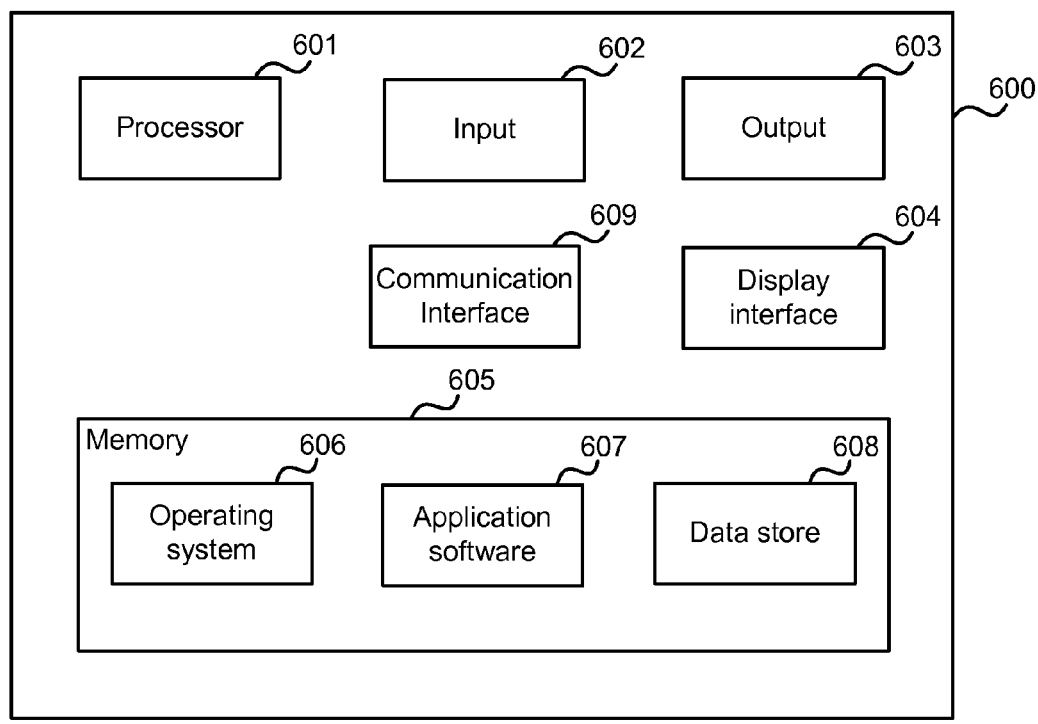
FIG. 6 illustrates an exemplary computing-based device in which embodiments of an information retrieval system may be implemented.

FIG. 6 illustrates various components of an exemplary computing-based device 600 which may be implemented as any form of a computing and/or electronic device, and in which embodiments of an information retrieval system may be implemented.

The computing-based device 600 comprises one or more inputs 602 which are of any suitable type for receiving media content, Internet Protocol (IP) input, input from click records, information retrieval related input and other input. The device also comprises communication interface 609 for example, for communicating with a web-based search engine or other information retrieval engine.

Computing-based device 600 also comprises one or more processors 601 which may be microprocessors, controllers or any other suitable type of processors for processing computing executable instructions to control the operation of the device in order to carry out information retrieval. Platform software comprising an operating system 606 or any other suitable platform software may be provided at the computing-based device to enable application software 607 to be executed on the device.

The computer executable instructions may be provided using any computer-readable media, such as memory 605. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output 603 is also provided such as an audio and/or video output to a display system integral with or in communication with the computing-based device. The display system may provide a graphical user interface, or other user interface of any suitable type although this is not essential. For example a display interface 604 may be provided such as a web-based display interface or other display interface.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method comprising:
   employing a processor to execute computer-executable instructions stored on a computer-readable medium to perform the following acts:
   accessing a click record comprising query-document pair information;
   forming a bipartite click graph comprising nodes connected by edges, each node representing any of a document and a query and each edge representing at least one observed click;
   specifying a path length being a number of steps of a walk of the bipartite click graph, wherein specifying the path length comprises setting the number of steps of the walk wherein a stationary distribution below a threshold is maintained during the walk of the bipartite click graph, wherein the number of steps of the walk is based at least in part on a calculated mixing time of the bipartite click graph, the mixing time represents a length of time to reach the stationary distribution, and the stationary distribution represents when all information about a starting node of the walk is lost;
   given at least one first node in the bipartite click graph, determining a similarity measure between the first node and each of a plurality of second nodes, wherein the number of steps in the bipartite click graph between each second node and the first node is equal to the specified path length, and wherein the determined similarity measure is based at least in part on the specified path length;
   ranking the second nodes on the basis of the similarity measure results; and
   retrieving information from the click record associated with the second nodes based at least in part on the ranking information.

2. The computer-implemented method as claimed in claim 1 wherein the similarity measure comprises any of: a random walk based similarity measure, a distance measure, a forward random walk based similarity measure, a backward random walk based similarity measure, first passage time of a Random walk, and measures based on graph conductance.

3. The computer-implemented method as claimed in claim 1 wherein forming the click graph comprises adding self-transitions to one or more of the nodes in the graph.

4. The computer-implemented method as claimed in claim 1 wherein forming the click graph comprises specifying a one-step transition probability for each given edge representing a probability of transitioning over the given edge in the click graph.

5. The computer-implemented method as claimed in claim 4 wherein, for a given node, the one-step transition probabilities of each edge emanating from the given node are substantially the same as one another.

6. The computer-implemented method as claimed in claim 4 wherein, the one step transition probabilities of each given edge are related to a total number of clicks observed for the given edge.

7. The computer-implemented method as claimed in claim 4 wherein, for a given node, the one step transition probabilities of each given edge emanating from the given node are related to both the observed clicks for the given edge and the one step transition probabilities of the other edges emanating from the given node.

8. The computer-implemented method as claimed in claim 4 wherein the one-step transition probabilities are represented using a sparse matrix and wherein the similarity measure is determined using sparse matrix operations.

9. The computer-implemented method as claimed in claim 1 wherein the similarity measure comprises a random walk which, for each given second node, combines the probabilities of all paths of a specified length between the first node and the given second node.

10. The computer-implemented method as claimed in claim 1 wherein the similarity measure comprises, for each given second node, a measure of a volume of paths between the first node and the given second node.

11. The computer-implemented method as claimed in claim 1 wherein the similarity measure comprises a backwards random walk, and wherein the first node represents a given node at which a walk of specified length ended and wherein the backwards random walk comprises calculating a probability of starting at each of the second nodes by using Bayes rule.

12. The computer-implemented method as claimed in claim 1 which further comprises repeating the determining a similarity measure, the ranking the second nodes on the basis of the similarity measure results, and the using the ranking information to retrieve information from the click record associated with the second nodes for another first node.

13. An information retrieval system comprising:
   a processor;
   an input device coupled to the processor and configured to access a bipartite click graph stored in memory comprising nodes connected by edges, each node representing any of a document and a query and each edge representing at least one observed click associating a query and a document;
   wherein the processor is configured to:
   specify a path length being a number of steps of a walk of the bipartite click graph, wherein specifying the path length comprises setting the number of steps of the walk wherein a stationary distribution below a threshold is maintained during the walk of the bipartite click graph, wherein the number of steps of the walk is based at least in part on a calculated mixing time of the bipartite click graph, the mixing time represents a length of time to reach the stationary distribution, and the stationary distribution represents when all information about a starting node of the walk is lost;

determine, when given at least one first node in the bipartite click graph, a similarity measure between the first node and each of a plurality of second nodes, wherein the number of steps in the bipartite click graph between each second node and the first node is equal to the specified path length, and wherein the determined similarity measure is based at least in part on the specified path length;

rank the second nodes on the basis of the similarity measure results;

use the ranking information to retrieve information from a click record associated with the second nodes; and store the retrieved information in the memory.

14. The information retrieval system as claimed in claim 13 wherein the similarity measure comprises any of: a random walk based similarity measure, a distance measure, a forward random walk based similarity measure, a backward random walk based similarity measure, first passage time of a Random walk, and measures based on graph conductance.

15. The information retrieval system as claimed in claim 13 wherein the processor is further configured to access a path length being a number of steps in the graph and wherein the processor is further configured to determine the similarity measure such that the number of steps between each second node and the first node is equal to the path length.

16. The information retrieval system as claimed in claim 13 which comprises an input device coupled to the processor configured to receive click information relating to the retrieved information and an output arranged to send the click information to the click graph for updating the click graph.

17. The information retrieval system as claimed in claim 13 wherein the first node is a query node and the second nodes are document nodes and wherein the similarity measure comprises a backwards random walk process.

18. One or more computer-readable storage media with computer-executable instructions that, when executed on a processor, configure the processor to perform acts comprising:

accessing a click record comprising query-document pair information;

forming a bipartite click graph comprising nodes connected by edges, each node representing any of a document and a query and each edge representing at least one observed click;

specifying a path length being a number of steps of a walk of the bipartite click graph, wherein specifying the path length comprises setting the number of steps of the walk wherein a stationary distribution below a threshold is maintained during the walk of the bipartite click graph, wherein the number of steps of the walk is based at least in part on a calculated mixing time of the bipartite click graph, the mixing time represents a length of time to reach the stationary distribution, and the stationary distribution represents when all information about a starting node of the walk is lost;

given at least one first node in the bipartite click graph, determining a similarity measure between the one first node and each of a plurality of second nodes, wherein the number of steps in the bipartite click graph between each second node and the first node is equal to the specified path length, and wherein the determined similarity measure is based at least in part on the specified path length;

ranking the second nodes on the basis of the similarity measure results; and retrieving information from the click record associated with the second nodes based at least in part on the ranking information.

19. One or more computer-readable storage media as claimed in claim 18 wherein the similarity measure comprises any of: a random walk based similarity measure, a distance measure, a forward random walk based similarity measure, a backward random walk based similarity measure, first passage time of a Random walk, and measures based on graph conductance.

* * * * *